United States Patent
Chung et al.

(10) Patent No.: US 7,471,480 B2
(45) Date of Patent: Dec. 30, 2008

(54) SELF SERVO WRITING METHOD, HARD DISK DRIVE USING THE SAME, AND RECORDING MEDIUM STORING THE METHOD

(75) Inventors: Da-woon Chung, Suwon-si (KR); Kwang-jo Jung, Suwon-si (KR); Jun Jeong, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 87 days.

(21) Appl. No.: 11/282,670

(22) Filed: Nov. 21, 2005

(65) Prior Publication Data

US 2006/0109584 A1    May 25, 2006

(30) Foreign Application Priority Data

Nov. 23, 2004    (KR) .................... 10-2004-0096150

(51) Int. Cl.
G11B 21/02 (2006.01)
G11B 5/584 (2006.01)
(52) U.S. Cl. .................... 360/75; 360/77.08
(58) Field of Classification Search .............. None
See application file for complete search history.

(56) References Cited

U.S. PATENT DOCUMENTS

| | | | | |
|---|---|---|---|---|
| 4,414,589 A * | 11/1983 | Oliver et al. | ............. | 360/77.07 |
| 5,570,247 A * | 10/1996 | Brown et al. | .................. | 360/75 |
| 6,344,942 B1 * | 2/2002 | Yarmchuk | .................... | 360/75 |
| 6,724,558 B2 * | 4/2004 | Bryant et al. | ................. | 360/75 |
| 6,765,744 B2 * | 7/2004 | Gomez et al. | ................. | 360/75 |
| 6,930,852 B2 * | 8/2005 | Kim | ........................ | 360/77.08 |
| 6,989,951 B2 * | 1/2006 | Lee et al. | ...................... | 360/51 |
| 7,068,459 B1 * | 6/2006 | Cloke et al. | ................... | 360/75 |
| 7,158,330 B2 * | 1/2007 | Morris et al. | ................. | 360/75 |
| 7,177,110 B2 * | 2/2007 | Ehrlich et al. | ................. | 360/75 |

FOREIGN PATENT DOCUMENTS

| | | |
|---|---|---|
| JP | 1-296473 | 11/1989 |
| JP | 07-065522 | 3/1995 |
| JP | 2000-048504 | 2/2000 |
| JP | 2002-230929 | 8/2002 |

OTHER PUBLICATIONS

Korean Office Action for corresponding Korean Application No. 10-2004-0096150 dated May 24, 2006.

* cited by examiner

*Primary Examiner*—K. Wong
(74) *Attorney, Agent, or Firm*—Staas & Halsey LLP

(57) ABSTRACT

Provided is a self servo writing method of writing a final servo signal based on a reference servo signal in a hard disk drive, and more particularly, a method of writing a uniform final self servo signal by compensating for a non-uniform width of tracks where a reference servo signal is written, a hard disk drive using the method, and recording medium storing the method. The self servo writing method includes measuring the width of a target track based on the reference servo information, calculating the deviation between the measured width and a target width, and writing the final servo information while following the target track based on the center position of the target track calculated using the reference servo information and the calculated deviation of track width. According to the self servo writing method, the final servo information is written on tracks having a uniform width, even if the reference servo information is written on tracks having a non-uniform width.

16 Claims, 7 Drawing Sheets

SELF SERVO WRITING METHOD, HARD DISK DRIVE USING THE SAME, AND RECORDING MEDIUM STORING THE METHOD

CROSS-REFERENCE TO RELATED APPLICATIONS

This application claims the benefit of Korean Patent Application No. 10-2004-0096150, filed on Nov. 23, 2004, in the Korean Intellectual Property Office, the disclosure of which is incorporated herein by reference.

BACKGROUND OF THE INVENTION

1. Field of the Invention

The present invention relates to a self servo writing method of writing a final servo signal by using a reference servo signal in a hard disk drive, and more particularly, to a method of writing a uniform final self servo signal by compensating for a non-uniform track width where a reference servo signal is written, a hard disk drive using the method, and recording medium storing the method.

2. Description of the Related Art

A hard disk drive includes a plurality of magnetic heads suspended over rotating disks. The magnetic head reads and writes information on the disk by creating and sensing magnetic fields on the disk surfaces.

Each of the magnetic heads is attached to a flexure beam in order to assembly a head gimbal assembly (HGA). The HGA is attached to an actuator arm having a voice coil combined with a magnetic assembly. The voice coil and the magnetic assembly 28 constitute a voice coil motor. The voice coil motor rotates the actuator arm to move the magnetic head across the disk surfaces.

Typically, information is stored in eccentric tracks on the disk. The voice coil motor moves the magnetic head from track to track in order to access data stored on the disk surface. Each of the tracks comprises a plurality of sectors, and each sector comprises servo fields and data fields.

A tracking servo device of the hard disk drive keeps the magnetic head following the center of the track. The tracking servo reads servo burst signals from the disk, calculates the location of the magnetic head in relation to the center of the track, and controls the voice coil motor based on the calculated location to keep the magnetic head following the center of the track.

Servo information including the servo burst signals is written on the disk by a servo writer when the hard disk drive is manufactured.

A conventional method of writing the servo information uses a mechanical pushpin. The mechanical pushpin is attached to a master actuator arm at one end and extends into the hard disk drive through a servo write slot at the other end. The master actuator arm is operated under a closed loop using a positioner and a highly accurate encoder. In addition, during the servo writing process, a clock head is directed to write a clock track onto the disk to serve as a timing reference. This servo writing process suffers from problems associated with non-repetitive run-out (NRRO), disk flutter, and motor rocking, all of which reduce the accuracy in recording. Moreover, the use of the positioner and encoder greatly increases the expense associated with the servo writing process, and reduces productivity.

In order to solve these problems, methods of offline servo writing and self servo writing have been developed.

In the offline servo writing method, each disk is servo-written using an offline servo track writer before installation into the hard disk drive assembly. On the other hand, the self servo writing method is a method of writing final servo information by tracing pre-written reference servo information. In this method, the quality of written servo information is dependent on the accuracy of the reference servo information.

Higher data volumes of the hard disk drive require a higher track density, which unavoidably reduces a track margin. Therefore, it is important to keep the width of the track uniform.

A non-uniform track width can cause various problems. A magneto-resistive (MR) head is comprised of a read head and a write head. An MR offset, in which the distance between the center of the read head and the center of the write head is varied depending on the head position on the disk, is caused. Therefore it is necessary to compensate for the position of the read head by an amount equal to the MR offset in the track, so that the read head accurately follows the track written by the write head.

To this end, when the hard disk drive is manufactured, the MR offset is measured at several positions on the disk and stored in a memory. Hard disk drive compensates the position of the read head by using the stored MR offset in a read mode. When the magnetic head is between the sampled positions, the MR offset is calculated using interpolation based on the measured MR offsets at the adjacent sampled positions. The interpolation is based on the supposition in which a track width is uniform. If the width of the track is not uniform, it cannot be done adequately to compensate the MR offset by using interpolation.

When the MR offset is measured at a track having a non-uniform width, it also cannot be done adequately to compensate MR offset because the measured MR offset is not correct.

When data is written on a track having a non-uniform width especially, a track having a narrow width than others, data written on adjacent tracks might be erased.

In order to solve these problems, the conventional method measures the width of every track on the disk, and regards tracks having non-uniform width as defect tracks.

However, as the track density increases, the time taken to measure the track width increases, and the number of defect tracks increases.

SUMMARY OF THE INVENTION

The present invention provides a self servo writing method of writing final servo information having reference servo information as a reference, capable of writing the final servo information on tracks having a uniform track width even if the reference servo information is written on tracks having a non-uniform track width.

The present invention also provides a hard disk drive using the method.

The present invention also provides recording medium storing the method.

According to an aspect of the present invention, there is provided a self servo writing method of writing final servo information based on reference servo information in a hard disk drive, the self servo writing method including measuring the width of a target track based on the reference servo information, calculating the deviation between the measured width and a target width, and writing the final servo information while following the target track based on the center position of the target track calculated using the reference servo information and the calculated deviation of track width.

The target width may be the average width of a plurality of tracks where the reference servo information is written before the target track and the average of track widths calculated using the reference servo information with respect to the plurality of tracks where the reference servo information is written before the target track.

The reference servo information may be written using a four-burst method.

According to another aspect of the present invention, there is provided a hard disk drive including a head disk assembly including a reference disk, where reference servo information is written, and one or more blank disks, a head which accesses the disks using a voice coil motor, a write/read circuit which writes final servo information on the reference disk and all blank disks via the head according to a controller, and reads the reference servo information from the reference disk, and the controller which controls the voice coil motor and the read/write circuit based on the reference servo information read from the reference disk in a self servo writing mode, and writes the final servo information on the reference disk and the blank disks, wherein the controller measures the width of a target track based on the reference servo information, calculates the deviation between the measured width and a target width, and writes the final servo information while following the target track based on the center position of the target track calculated using the reference servo information and the calculated deviation of track width.

According to still another aspect of the present invention, there is provided a computer readable medium having embodied thereon a computer program for executing a self servo writing method of writing final servo information based on reference servo information in a hard disk drive, the self servo writing method including measuring the width of a target track based on the reference servo information, calculating the deviation between the measured width and a target width, and writing the final servo information while following the target track based on the center position of the target track calculated using the reference servo information and the calculated deviation of track width.

Additional aspects and/or advantages of the invention will be set forth in part in the description which follows and, in part, will be apparent from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
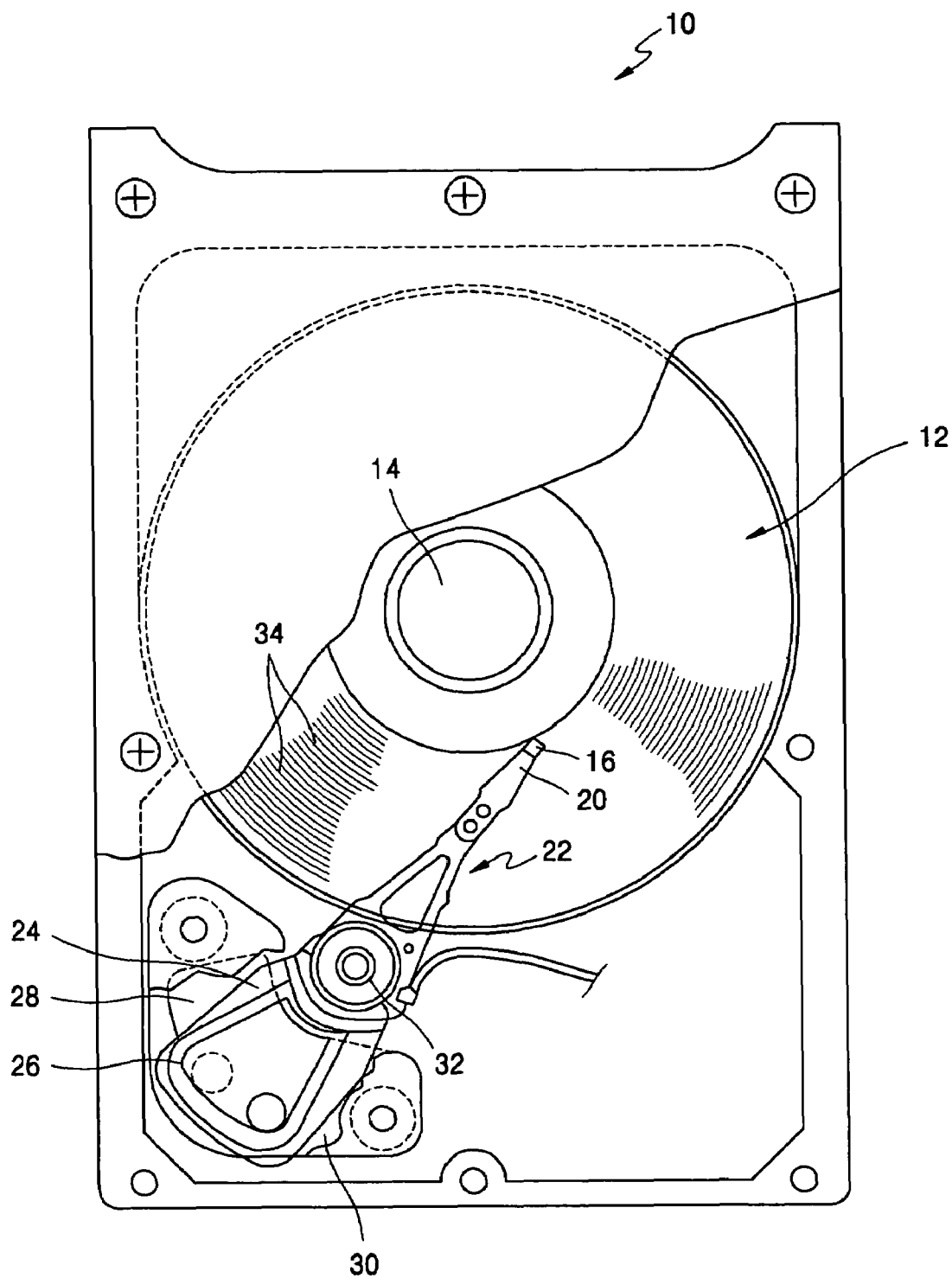
FIG. 1 is a plan view of a head disk assembly 10 illustrating a hard disk drive according to an embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

A hard disk drive comprises a head disk assembly and circuitry.

FIG. 1 is a plan view illustrating a head disk assembly (HDA) 10 of a hard disk drive according to an embodiment of the present invention. In FIG. 1, the HDA 10 comprises at least one magnetic disk 12 rotated by a spindle motor 14. The HDA 10 further comprises a transducer (not shown) adjacent to the surfaces of magnetic disks 12.

The transducer reads and writes information on the disks 12 by creating and sensing magnetic fields of the disks 12. Typically, one transducer is positioned on each of the disk surfaces. Although a single transducer is described, it should be understood that the transducer comprises a read transducer for sensing the magnetic fields of the disks 12 and a write transducer for magnetizing the disks 12. The read transducer is made of a magneto-resistive (MR) material.

The transducer may be integrated into a head 16. An air bearing is typically formed between the transducer and the disk surface by the motion of the disks 12. The head 16 is incorporated into a head stack assembly 22. The head stack assembly 22 is attached to an actuator arm 24 having a voice coil 26. The voice coil 26 is located adjacent to a magnetic assembly 28 to make a voice coil motor 30. When a current is supplied to the voice coil 26, the voice coil motor 30 generates a torque for rotating the actuator arm 24 about a bearing assembly 32. Rotation of the actuator arm 24 will move the transducer across the disk surface.

Typically, information is stored in eccentric tracks 34 on the disk 12. Each of the tracks 34 comprises a plurality of sectors, and each sector comprises servo fields and data fields.

Figure 2:
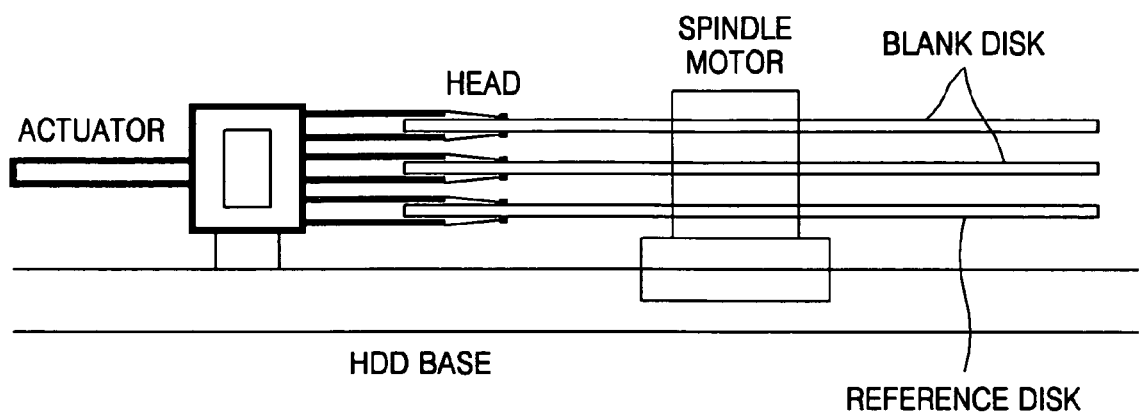
FIG. 2 is a schematic view illustrating a reference disk and blank disks assembled in the head disk assembly 10.

FIG. 2 is a schematic view illustrating a reference disk and blank disks assembled in the HDA 10. In FIG. 2, in the self servo writing method according to the present invention, a single reference disk and one or more blank disks are assembled in the HDA 10. In FIG. 2, only two blank disks are shown, for the sake of convenience.

Figure 3:
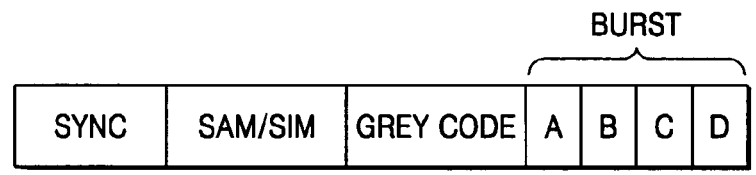
FIG. 3 is a diagram illustrating servo information written on a disk of the hard disk drive.

FIG. 3 is a diagram of servo information written on a disk of the hard disk drive. In FIG. 3, servo information is written along the track, and includes a servo synchronization signal (SYNC), servo address/index mark signals (SAM/SIM), a gray code, and bursts A, B, C, and D.

Figure 4A:
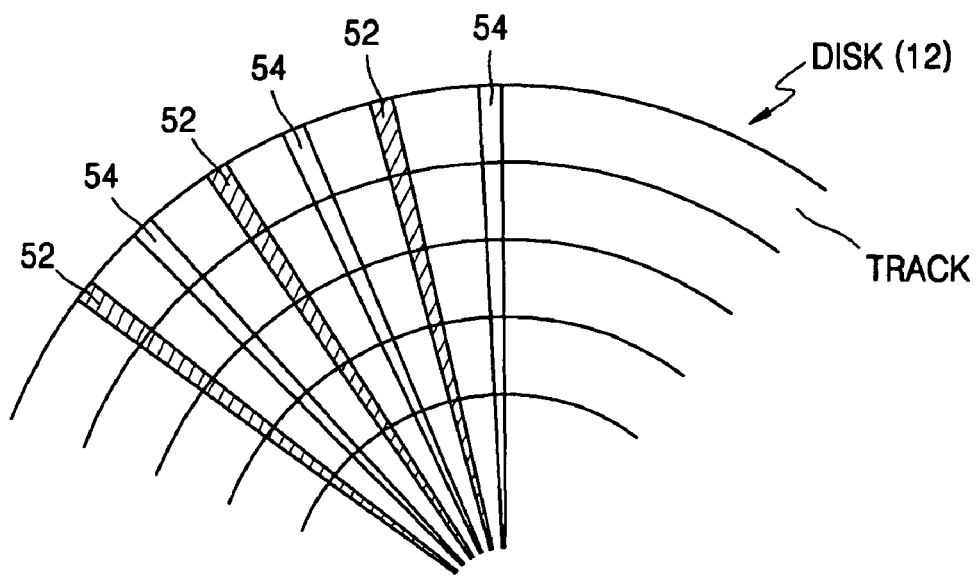
FIGS. 4A and 4B are diagrams illustrating a self servo writing method according to an embodiment of the present invention.
Figure 4B:
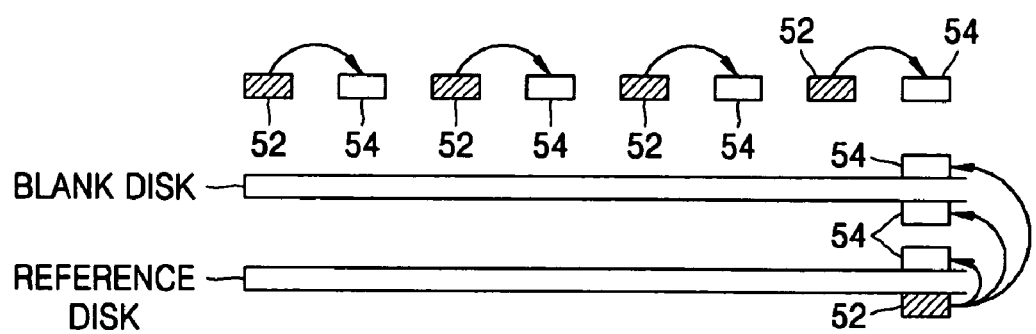

FIGS. 4A and 4B are diagrams of a self servo writing method according to an embodiment of the present invention. Reference servo information 52 is used to write final servo information 54.

In FIG. 4A, the reference servo information 52 is written on the disk radially, at an appropriate number of positions. Multiple final servo information 54 is written on the disk based on single reference servo information 52.

In FIG. 4B, the reference servo information 52 is written on one side of a reference disk, from among the disks assembled in the HDA 10. The final servo reference information 54 is written on the other side of the reference disk and the other disks, based on the reference servo information 52. The reference disk can be prepared offline before the disk is assembled into the HDA 10, or online after the disk is assembled into the HDA 10.

Writing of the final servo reference information 54 on the disk based on the reference servo information 52 is referred to as servo copy.

Figure 5:
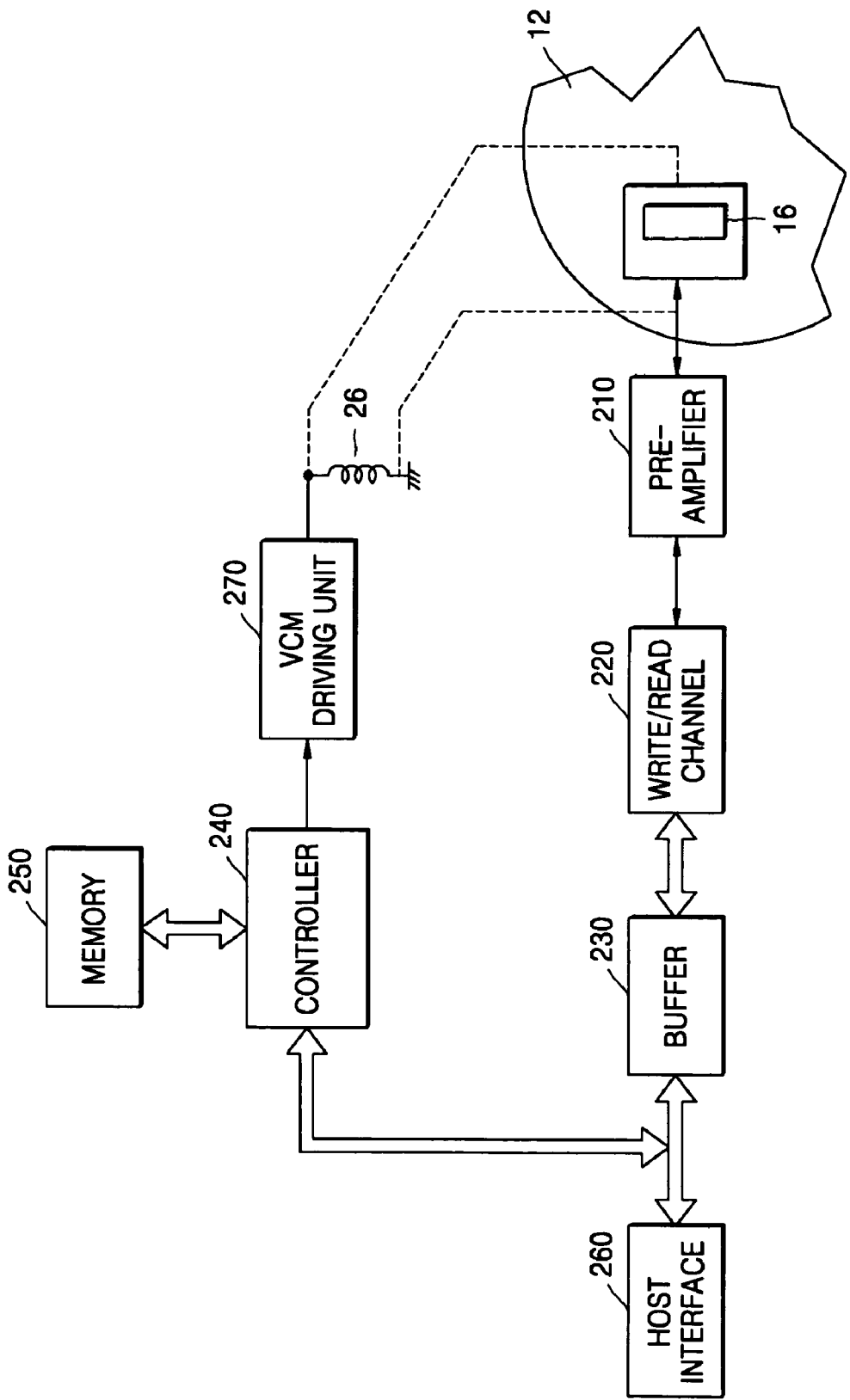
FIG. 5 is a circuit diagram illustrating a hard disk drive according to an embodiment of the present invention.

FIG. 5 is a circuit diagram of a hard disk drive according to an embodiment of the present invention. In FIG. 5, the disk drive comprises disks 12, a transducer 16, a pre-amplifier 210, a write/read channel 220, a buffer 230, a controller 240, a memory 250, a host interface 260, and a VCM driving unit 270.

The pre-amplifier 210 and the write/read channel 220 are collectively referred to as a write/read circuit.

A firmware program and information on servo address and index signal specifications of the reference and final servo patterns are stored in the memory 250. The memory 250 is a flash memory, that is, a non-volatile memory.

In a read mode of the disk drive, the transducer 16, sometimes referred as a head, senses data on the disk 12 to output an electrical signal. The electrical signal is amplified with a signal process in the pre-amplifier 210. An amplified signal in an analog form is encoded into a digital signal by the write/read channel 220, so that the digital signal can be read by a host system (not shown). The digital signal is converted into a data stream. The data stream is temporarily stored in the buffer 230 and then transmitted to the host system through the host interface 260. In a self servo writing mode, the reference servo information read from the reference disk is sequentially stored in the buffer 230.

In a write mode of the disk drive, data is received from the host system through the host interface 260 and temporarily stored in the buffer 230. The data stored in the buffer 230 is sequentially output and converted into a binary data stream. The data is written on the disk 12 by the transducer 16 using a write current amplified by the pre-amplifier 210.

The controller 240 analyzes commands received from the host system through the host interface 260 and controls the disk drive based on the commands. When a self servo writing command is received from the host system, the transducer 16 follows tracks based on the reference servo information 52 written on the reference disk and writes the final servo information 54 on the reference disk and all the blank disks.

More specifically, the controller 240 controls the voice coil motor, follows tracks in the reference disk, sequentially reproduces the reference servo information, stores the reproduced servo patterns in the buffer 230, and generates the final servo information based on the reference servo information stored in the buffer 230. The final servo information is simultaneously written on the reference disk and all the blank disks in the HDA 10.

It is actually difficult to write the reference servo information 52 on tracks having a uniform width. A servo writer (not shown) that writes the reference servo information 52 must accurately control position without disturbance, which is difficult to achieve due to expense, working environment, etc. The track width changes according to skew of the head, or position of the head on the disk.

As the track width of the hard disk drive gradually became narrow, the influences in MR offset compensation, adjacent track erasure, etc are gradually increased.

The present invention provides a self servo writing method of writing the final servo information on tracks having a uniform track width even if the reference servo information is written on tracks having a non-uniform width.

Figure 6:
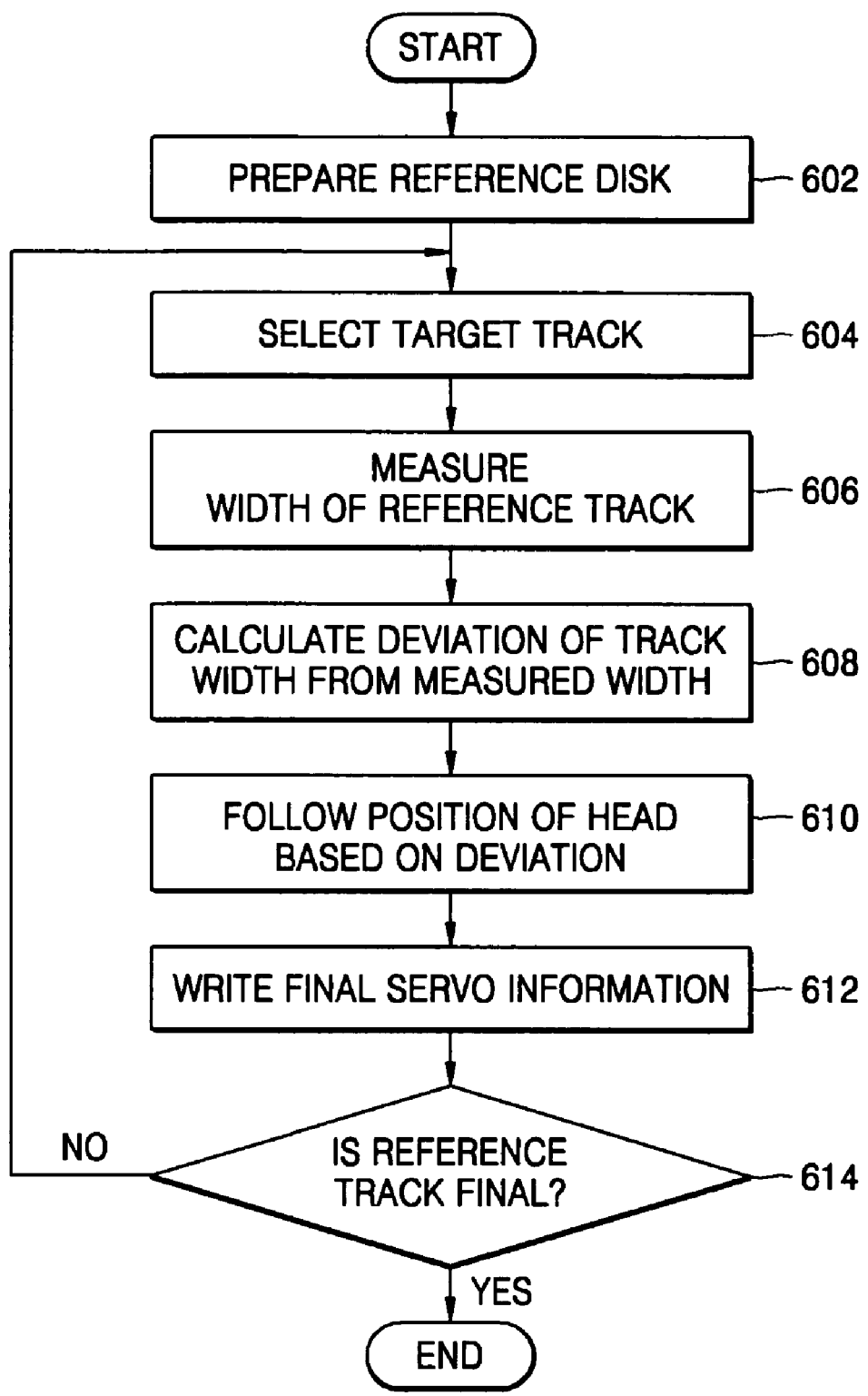
FIG. 6 is a flow chart illustrating the self servo writing method according to an embodiment of the present invention.

FIG. 6 is a flow chart illustrating the self servo writing method according to an embodiment of the present invention. In FIG. 6, a reference disk is prepared (Operation 602). As shown in FIGS. 4A and 4B, the reference servo information 52 is written on one side of the reference disk. The reference disk might be prepared offline or online. The final servo information 54 is written on the reference disk and all the blank disks, based on the reference servo information 52.

The position where the final servo information 54 is written is determined based on the reference servo information 52. The final servo information is written simultaneously on all the disks, not sequentially. Writing of the final servo information 54 on one side of the disk will be described for the sake of convenience.

A track (target track) for performing the servo copy is selected (Operation 604). The selected track is a track (reference track) where the reference servo information 52 is written. The final servo information 54 is sequentially written on the disk in a radial direction. When the reference track is selected, the head is controlled to follow the reference track.

The width of the target track is measured (Operation 606), based on the reference servo information.

The deviation of the track width from the measured width is calculated (Operation 608). The deviation of the track width is the difference between the measured width and a target width. The target width is the average width of tracks where the reference servo information is written.

The deviation of the track width periodically changes in the reference disk, because feedback control is used to control the position of the head when the reference servo information is written on the track. Since the average width of tracks is nearly constant, the average width is used as the target width. If the target width is fixed, cumulative deviation causes inconsistency between the reference servo information and the final servo information. In order to prevent inconsistency, the average width is used as the target width.

The position of the head is followed (Operation 610) based on the center position of the track where the reference servo information is written and the deviation of the track width, and the final servo information is written on the reference disk (Operation 612).

It is determined whether the selected track is the final reference track (Operation S614). If the selected track is the final reference track, the servo copy is ended. If the selected track is not the final reference track, the process returns to Operation 604 and the next reference track is selected.

Figure 7:
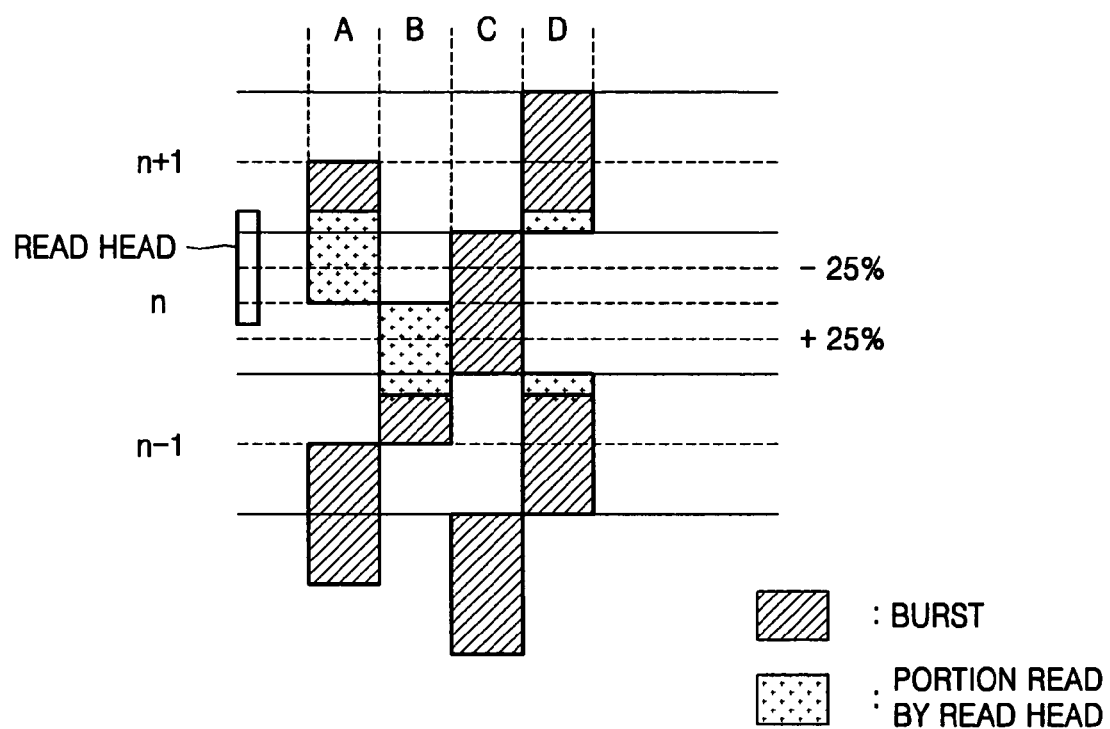
FIG. 7 is a diagram illustrating a method of measuring the width of the reference track, as part of the method of FIG. 6.

FIG. 7 is a diagram of a method of measuring the width of the reference track in Operation 606 of FIG. 6. FIG. 7 shows the reference track and reference servo burst signals using a four-burst method. A three-burst method, the four-burst method, and a spiral method are used to write the reference servo information. The three-burst method uses three burst signals A, B, and C in which the width of the reference track is not equal to the width of the track where the final servo information is written. The four-burst method uses four burst signals A, B, C, and D in which the width of the reference track is equal to the width of the track where the final servo information is written. In the spiral method, the reference signal is written in a spiral shape instead of radial shape. The self servo writing method of the present invention may be used in all of the three-burst method, the four-burst method, and the spiral method. However, it is more efficient to adapt to the four-burst method than others in referring aspects of accuracy to calculate the track width and easiness to use.

The method of measuring the width of the reference track using the four-burst method will be described for the sake of convenience. Putting up with more or less complexity, a self servo writing method of the present invention can be performed in a 3 burst method and a spiral method as well as a four-burst method without departing from the principle of the invention.

In the four-burst method, four burst signals having a predetermined width and length are aligned along with the track direction. The width of each of the four burst signals is the same as the track width in FIG. 7. The four burst signals are each positioned on different radii. More specifically, four burst signals are aligned by their length in the track direction, and by at least ½ of the track width in the radial direction.

When the head follows the track, the amplitudes of the four burst signals read by the head are compared to locate the head from the center of the track. For example, a position where burst signal A has the same amplitude as burst signal B is the center line of an $n^{th}$ track, and a position where burst signal C has the same amplitude as burst signal D is a boundary between tracks.

The width of the read head is greater than ½ of the track width.

The width of the target track is calculated as below.

The read head is off tracked by −25% (¼ track width upward in FIG. 7) from the center line of the target track to detect a difference in the amplitude of A and D burst signals. As a result, the center line of the read head is located at 25% upward from the center line of the target track. Since burst signal A is written on the center line between the target track and upper adjacent track, burst signal A is completely read by the read head. Since burst signal D is written on above and below tracks adjacent to the target track, and the width of the read head is greater than ½ of the track width, part of the upper burst signal D is read by the read head. Upper halves (½ of the widths) of burst signals A and D above the center line of the target track are read by the read head. Half of the widths of burst signals A and D above the center line of the target track can be identified by the difference in the amplitude of burst signals A and D read by the read head, i.e., A-D.

The read head is off tracked by 25% (¼ track width downward in FIG. 7) from the center line of the target track to detect the difference in the amplitude of burst signals B and D. Since burst signal B is written on the center line between the target track and lower adjacent track, burst signal B is completely read by the read head. Since burst signal D is written on above and below tracks adjacent to the target track, and the width of the read head is greater than ½ of the track width, part of the lower burst signal D is read by the read head. Lower halves burst signals B and D below the center line of the target track are read by the read head. Half of the widths of burst signals B and D below the center line of the target track can be identified by the difference in the amplitude of burst signals B and D read by the read head, i.e., B-D.

The width of the target track is calculated by adding A-D and B-D.

Figure 8A:
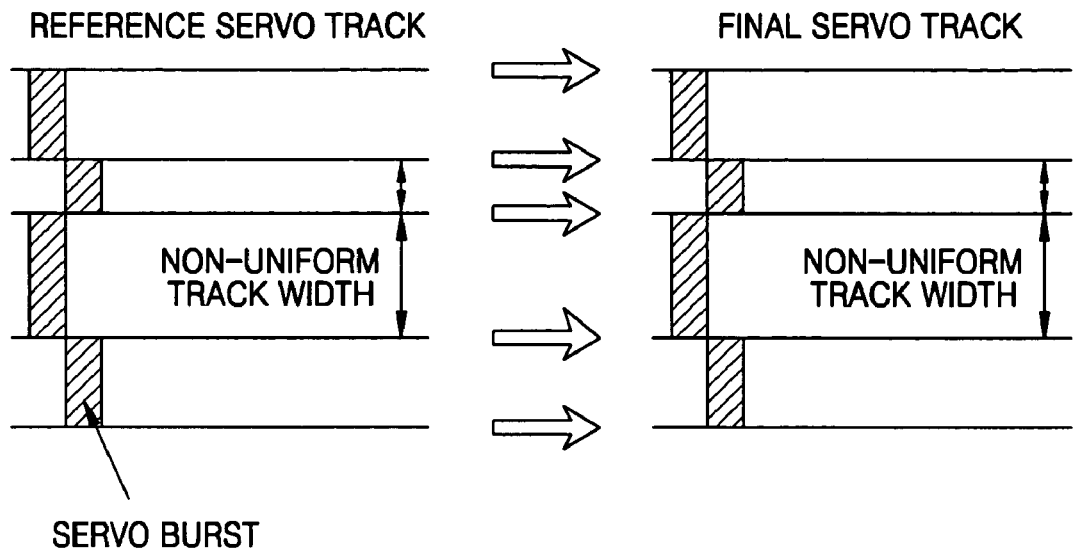
FIGS. 8A and 8B are diagrams illustrating a conventional self servo writing method, and the self servo writing method according to an embodiment of the present invention respectively.
Figure 8B:
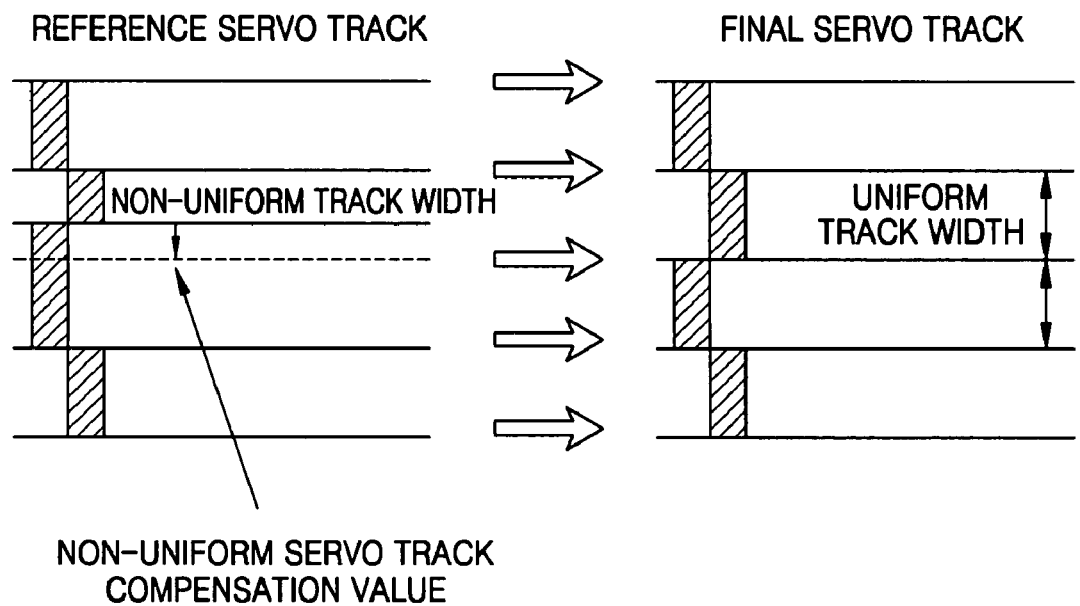

FIGS. 8A and 8B are diagrams illustrating, respectively, a conventional self servo writing method, and the self servo writing method according to an embodiment of the present invention. In FIG. 8A, the conventional self servo writing method does not correct the width of tracks where the final servo information is written. The width of tracks when the reference servo information is written is identical to the width of tracks where the final servo information is written. That is, if the width of tracks where the reference servo information is written is not uniform, then the width of tracks where the final servo information is written is not also uniform.

In FIG. 8B, the self servo writing method according to an embodiment of the present invention corrects the width of tracks when the final servo information is written. The width of tracks where the final servo information is written is uniform. That is, even if the width of tracks where the reference servo information is written is not uniform, the width of tracks where the final servo information is written is uniform, because the final servo information is written on the reference track having a non-uniform width by allowing the head to follow the reference track according to the difference between the width of the reference track and width of the average track.

The present invention may be implemented as a method, apparatus, system, or other manifestation. When implemented in software, elements of the present invention are essentially code segments to perform necessary tasks. The code segments or a program can be stored in a processor readable medium or transmitted as computer data signals coupled to a carrier wave through a communication medium or network. The processor readable medium includes any medium that can store or transfer information. Examples of the processor readable medium include an electronic circuit, a semiconductor memory device, a ROM, a flash memory, an erasable ROM, a floppy diskette, a CD-ROM, an optical disk, a hard disk, an optical fiber medium, an RF network, etc. Examples of the computer data signals include any signals that can be transmitted through a transmission medium such as an electronic network channel, an optical fiber, air, an electromagnetic network, and an RF network.

According to the self servo writing method, the final servo information is written on tracks having a uniform width, even if the reference servo information is written on tracks having a non-uniform width.

According to the self servo writing method, the final servo information is written on tracks having a uniform width, thereby compensating for the MR offset, and preventing adjacent tracks from being erased.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A self servo writing method of writing final servo information based on reference servo information in a hard disk drive, the self servo writing method comprising:
   measuring the width of a target track based on the reference servo information;
   calculating the deviation between the measured target track width and a target width, the target width being an average width of a plurality of tracks where the reference servo information is written before the target track; and
   writing the final servo information on tracks having a substantially uniform width from an inner diameter of a disc to an outer diameter of the disc, while following the target track based on the center position of the target track calculated using the reference servo information and the calculated deviation of target track width.

2. The self servo writing method according to claim 1, wherein the target width is the average of track widths calculated using the reference servo information with respect to the plurality of tracks where the reference servo information is written before the target track.

3. The self servo writing method according to claim 1, wherein the reference servo information is written using a four-burst method.

4. The self servo writing method of the hard disk drive according to claim 1, wherein measuring the width of the target track comprises:

detecting the difference in amplitude of a burst signal A and a burst signal D in which the burst signal A is written on the center line between the target track and tracks adjacent to and tracked off the target track, and burst signal D is written on tracks tracked off tracks adjacent to the target track by tracking off a read head by −25% from the center line of the target track towards the outer edge of the disk to follow the target track;

detecting the difference in amplitude of a burst signal B and a burst signal D in which the burst signal B is written on the center line between the target track and tracks adjacent to and tracked off the target track, and burst signal D is written on tracks tracked off tracks adjacent to the target track by tracking off the read head by 25% from the center line of the target track towards the center of the disk to follow the target track; and calculating the width of the target track by adding the detected amplitude differences.

5. The self servo writing method of the hard disk drive according to claim 1, wherein the hard disk drive includes a reference disk and one or more blank disks.

6. The self servo writing method of the hard disk drive according to claim 5, wherein the reference disk is prepared offline.

7. The self servo writing method of the hard disk drive according to claim 5, wherein the reference disk is prepared online.

8. A hard disk drive comprising:
a head disk assembly comprising a reference disk, where reference servo information is written, and one or more blank disks;
a head to access the disks using a voice coil motor;
a write/read circuit to write final servo information on the reference disk and all blank disks via the head according to a controller, and reads the reference servo information from the reference disk; and
the controller to control the voice coil motor and the write/read circuit based on the reference servo information read from the reference disk in a self servo writing mode, and to write the final servo information on the reference disk and the blank disks,
wherein the controller measures the width of a target track based on the reference servo information, calculates the deviation between the measured target track width and a target width and writes the final servo information on tracks having a substantially uniform width from an inner diameter of a disc to an outer diameter of the disc, while following the target track based on the center position of the target track calculated using the reference servo information and the calculated deviation of track width, wherein the controller calculates the target width by averaging widths of a plurality of tracks where the reference servo information is written before the target track.

9. The hard disk drive according to claim 8, wherein the reference servo information written on the reference disk is written using a four-burst method.

10. The hard disk drive according to claim 8, wherein the controller detects the difference in amplitude of a burst signal A and a burst signal D in which the burst signal A is written on the center line between the target track and tracks adjacent to and tracked off the target track, and burst signal D is written on tracks tracked off tracks adjacent to the target track by tracking off a read head by −25% from the center line of the target track towards the outer edge of the disk to follow the target track;

detects the difference in amplitude of a burst signal B and a burst signal D in which the burst signal B is written on the center line between the target track and tracks adjacent to and tracked off the target track, and burst signal D is written on tracks tracked off tracks adjacent to the target track by tracking off the read head by 25% from the center line of the target track towards the center of the disk to follow the target track; and calculates the width of the target track by adding the detected amplitude differences.

11. The hard disk drive according to claim 8, wherein the reference disk is prepared offline.

12. The hard disk drive according to claim 8, wherein the reference disk is prepared online.

13. A computer readable medium having embodied thereon a computer program for executing a self servo writing method of writing final servo information based on reference servo information in a hard disk drive, the self servo writing method comprising:
measuring the width of a target track based on the reference servo information;
calculating the deviation between the measured target track width and a target width, the target width being an average width of a plurality of tracks where the reference servo information is written before the target track; and
writing the final servo information on tracks having a substantially uniform width from an inner diameter of a disc to an outer diameter of the disc, while following the target track based on the center position of the target track calculated using the reference servo information and the calculated deviation of target track width.

14. The computer readable medium according to claim 13, wherein the target width is the average of track widths calculated using the reference servo information with respect to the plurality of tracks where the reference servo information is written before the target track.

15. The computer readable medium according to claim 13, wherein the reference servo information is written using a four-burst method.

16. The computer readable medium according to claim 13, wherein measuring the width of the target track comprises:
detecting the difference in amplitude of a burst signal A and a burst signal D in which the burst signal A is written on the center line between the target track and tracks adjacent to and off tracked from the target track, and burst signal D is written on tracks off tracked from tracks adjacent to the target track by off tracking a read head by −25% from the center line of the target track towards the outer edge of the disk to follow the target track;
detecting the difference in amplitude of a burst signal B and burst signal D in which the burst signal B is written on the center line between the target track and tracks adjacent to and off tracked from the target track, and burst signal D is written on tracks off tracked from tracks adjacent to the target track by off tracking the read head by 25% from the center line of the target track towards the center of the disk to follow the target track; and
calculating the width of the target track by adding the detected amplitude differences.

* * * * *